United States Patent [19]
Saito

[11] Patent Number: 4,486,498
[45] Date of Patent: * Dec. 4, 1984

[54] MAGNETIC RECORDING MEDIUM

[75] Inventor: Seitoku Saito, Tokyo, Japan

[73] Assignee: TDK Electronics Co., Ltd., Tokyo, Japan

[ * ] Notice: The portion of the term of this patent subsequent to Nov. 22, 2000 has been disclaimed.

[21] Appl. No.: 528,445

[22] Filed: Sep. 1, 1983

Related U.S. Application Data

[63] Continuation of Ser. No. 286,289, Jul. 23, 1981, Pat. No. 4,416,943.

[30] Foreign Application Priority Data

Sep. 1, 1980 [JP] Japan ............................ 55-120969

[51] Int. Cl.³ ............................................. B32B 15/00
[52] U.S. Cl. .................................. 428/333; 428/457; 428/694; 428/900
[58] Field of Search ............... 428/692, 694, 695, 900, 428/333, 457; 427/128, 131, 132

[56] References Cited

U.S. PATENT DOCUMENTS 4,210,946  7/1980  Iwasaki et al. ...................... 428/900
4,277,809  7/1981  Fisher et al. ........................ 428/900

FOREIGN PATENT DOCUMENTS 2506210   9/1975  Fed. Rep. of Germany ...... 427/128
5174605   6/1976  Japan ................................. 427/128
5438135   3/1979  Japan .
54140505 10/1979  Japan ................................. 427/131

Primary Examiner—George F. Lesmes
Assistant Examiner—P. R. Schwartz
Attorney, Agent, or Firm—Oblon, Fisher, Spivak, McClelland & Maier

[57] ABSTRACT

A magnetic recording medium comprises cobalt as a main component and at least one of zinc, rhodium and iridium as an additional component of an alloy of a magnetic layer.

2 Claims, No Drawings

MAGNETIC RECORDING MEDIUM

This is a continuation of application Ser. No. 286,289, filed July 23, 1981 now U.S. Pat. No. 4,416,943.

BACKGROUND OF THE INVENTION

1. FIELD OF THE INVENTION

The present invention relates to a magnetic recording medium having excellent magnetic characteristics of particle magnetic recording in super high density recording system.

2. DESCRIPTION OF THE PRIOR ART

Magnetic powder coated recording media prepared by coating a magnetic powder composition comprising fine magnetic particles made of $\gamma$-$Fe_2O_3$, $Fe_3O_4$, Co-$\gamma$-$Fe_2O_3$, Co-$Fe_3O_4$, Fe and Fe-Co etc. on a substrate have been used in various uses. However, in the preparation of such magnetic powder coated recording media, it is not easy to form a magnetic layer having a thickness of upto 1 $\mu$m in view of productivity, and it is not easy to give a desired improved characteristics such as an improvement of a recording density. From the viewpoint of the requirements, a new type magnetic recording medium having a thin metal or alloy layer formed by a plating process or a metal vapor deposition process has been proposed and practically employed. It is possible to prepare a magnetic recording medium having a thin metal or alloy layer which has a thin thickness such as upto 500 • whereby the recording density can be remarkably improved.

SUMMARY OF THE INVENTION

It is an object of the present invention to provide a magnetic recording medium having a thin alloy layer which has excellent magnetic characteristics.

It is another object of the present invention to provide a magnetic recording medium for perpendicular magnetic recording which is recently expected in a super high density recording system.

The foregoing and other objects of the present invention have been attained by providing a magnetic recording medium comprising cobalt as a main component and at least one of zinc, rhodium and iridium as an additional component of an alloy of the magnetic layer and the axes of easy magnetization of the metal component are substantially perpendicular to the surface of the magnetic layer. cl DETAILED DESCRIPTION OF THE PREFERRED EMBODIMENTS It has been studied to evaluate total characteristics of magnetic recording media prepared by forming a thin metal or alloy layer of Fe type, Co type, Ni type and Mn type metal or alloy by a chemical plating process, an electrochemical plating process, a vacuum vapor deposition process, an ion plating process or a sputtering process. As a result, it has been found that a magnetic recording medium having a thin alloy layer made of Co as a main component (at least 50 wt. % of Co.) and at least one of Zn, Rh and Ir as an additional component imparts remarkably excellent characteristics.

The present invention will be further illustrated by certain examples and references which are provided for purposes of illustration only and are not intended to be limiting the present invention.

EXAMPLE 1

A thin Co-Ir layer was formed by an electron beam vapor deposition process under the condition shown in Table 1.

TABLE 1

| Condition of Preparation | |
|---|---|
| Formulation of alloy | Co: 90 wt. %; Ir: 10 wt. % |
| Thickness | 0.2 $\mu$m |
| Substrate | polyester film |
| Background gas pressure | 5.8 × $10^{-6}$ Torr |
| Beam current | 0.8 A |
| Tilt angle | 30 degree |

EXAMPLE 2

A thin Co-Zn alloy layer was formed by a direct current dielectrode sputtering process under the condition shown in Table 2 after a chamber baking and a degasification of a substrate so as to reduce an adverse effect of impurities such as $N_2$ and $O_2$.

TABLE 2

| Condition of Sputtering | |
|---|---|
| Formulation of alloy | Co: 86 wt. %; Zn: 14 wt. % |
| Thickness | 0.5 $\mu$m |
| Substrate | polyimide film |
| Background gas pressure | 4.9 × $10^{-7}$ Torr |
| Argon gas pressure | 1.0 × $10^{-2}$ Torr |
| Plate voltage | 500 V |
| Plate current | 0.37 A |
| Temperature of substrate | 180° C. |

REFERENCE

A thin Co-Ni alloy layer was prepared by an electron beam vapor deposition under the condition shown in Table 3.

TABLE 3

| Condition of Preparation | |
|---|---|
| Formulation of alloy | Co: 80 wt. %; Ni: 20 wt. % |
| Thickness | 0.2 $\mu$m |
| Background gas pressure | 6.0 × $10^{-6}$ Torr |
| Tilt angle | 30 degree |
| Beam current | 0.8 A |
| Substrate | polyester film |

Magnetic characteristics of thin Co type alloy layers formed in Examples 1 and 2 and Reference 1 and recording characteristics of the magnetic recording media having the magnetic layer are shown in Table 4.

The magnetic recording medium of Example 1 had high in-plane coercive force to impart remarkably superior characteristics when it is used as a conventional in-plane type magnetic recording medium. Example 1 shows the embodiment of the thin Co-Ir alloy layer.

It was confirmed that when a thin Co-Zn alloy layer is formed by the same electron beam vapor deposition process, the thin Co-Zn alloy layer imparts the same characteristics as the thin Co-Ir alloy layer as the in-plane type magnetic recording medium.

The magnetic recording medium of Example 2 had excellent perpendicular anisotropy and perpendicular coercive force and excellent characteristics suitable for a perpendicular magnetic recording medium which is developing.

Each ideal perpendicular magnetic recording medium was also obtained by forming a thin Co-Rh alloy layer or a thin Co-Ir alloy layer by a sputtering process.

On the contrary, the magnetic recording medium of Reference had low coercive force and inferior recording characteristics. This is considered as follows:

The incorporation of Zn, Rh or Ir in Co in the present invention results in an enlargement of a stable region of hcp structure of Co which is magnetically preferable crystalline structure whereas the incorporation of Ni in Co in the reference results in a reduction of hcp stable region.

The thin alloy layer of the present invention has a thickness of 500 • to 3 μm. When it is less than 500 •, the magnetic moment is too low and a satisfactory S/N ratio can not be obtained whereas when it is more than 3 μm, the improvement of the characteristics balanced to a cost increase is not found.

Of course, the thin alloy layer of the present invention can be used as an upper layer of the two layer type magnetic recording medium which has a lower layer having high magnetic permeability whereby remarkable improvement of a recording sensitivity can be attained in comparison with the monolayer type magnetic recording medium.

TABLE 4

| Magnetic characteristics and Recording characteristics | | | |
|---|---|---|---|
| | Exp. 1 | Exp. 2 | Ref. |
| Magnetic characteristics: | | | |
| In-plane coercive force (Oe) | 1020 | 280 | 630 |
| Perpendicular coercive force (Oe) | — | 1430 | — |

TABLE 4-continued

| Magnetic characteristics and Recording characteristics | | | |
|---|---|---|---|
| | Exp. 1 | Exp. 2 | Ref. |
| Saturated magnetization (ewu/cc) | 830 | 620 | 880 |
| Squareness ratio | 0.98 | — | 0.96 |
| Anisotropy magnetic field (Oe) | — | 6040 | — |
| Recording characteristics: | | | |
| Type | In-plane | Perpendicular | In-plane |
| Recording density (KBPI) | 25 | 52 | 14 |
| S/N ratio (dB) | 31 | 43 | 26 |

I claim:

1. A magnetic recording medium comprising a substrate layer and at least one magnetic layer consisting essentially of cobalt as a main component and zinc, rhodium or iridium as an additional component wherein the ratio of Co:Zn ranges from 70-86:14-30, Co:Rh ranges from 73-85:15-27, and Co:Ir ranges from 75-90:10-25 of an alloy of a magnetic layer wherein axes of easy magnetization of said components are substantially perpendicular to a surface of said magnetic layer and thickness of said magnetic layer is in a range of 500 • to 3 μm.

2. The magnetic recording medium according to claim 1 wherein the upper layer of a two layer magnetic structure consists essentially of cobalt as a main component and zinc, rhodium or iridium as an additional component wherein the ratio of Co:Zn ranges from 70-86:14-30, Co:Rh ranges from 73-85:15-27, and Co:Ir ranges from 75-90:10-25 of an alloy of a magnetic layer wherein axes of easy magnetization of said components are substantially perpendicular to a surface of said magnetic layer and thickness of said magnetic layer is in a range of 500 • to 3 μm.

* * * * *